United States Patent
Moat et al.

(10) Patent No.: US 7,502,909 B2
(45) Date of Patent: Mar. 10, 2009

(54) MEMORY ADDRESS GENERATION WITH NON-HARMONIC INDEXING

(75) Inventors: Kent D. Moat, Winfield, IL (US); Raymond B. Essick, Glen Ellyn, IL (US); Michael A. Schuette, Wilmette, IL (US)

(73) Assignee: Motorola, Inc., Schaumburg, IL (US)

( * ) Notice: Subject to any disclaimer, the term of this patent is extended or adjusted under 35 U.S.C. 154(b) by 217 days.

(21) Appl. No.: 11/247,425

(22) Filed: Oct. 11, 2005

(65) Prior Publication Data

US 2007/0083729 A1    Apr. 12, 2007

(51) Int. Cl.
*G06F 12/00* (2006.01)
(52) U.S. Cl. .................. 711/217; 711/214; 711/219; 711/220
(58) Field of Classification Search .................. 711/217, 711/214, 219, 220
See application file for complete search history.

(56) References Cited

U.S. PATENT DOCUMENTS

| | | | |
|---|---|---|---|
| 5,422,995 A * | 6/1995 | Aoki et al. ................ | 345/545 |
| 5,628,026 A | 5/1997 | Baron et al. | |
| 6,799,261 B2 | 9/2004 | May et al. | |
| 2004/0117595 A1 | 6/2004 | Norris et al. | |

\* cited by examiner

*Primary Examiner*—Jasmine Song

(57) ABSTRACT

A method for generating a sequence of memory addresses for a multi-dimensional data structure and an address generation unit are disclosed. The address generation unit includes an ADDRESS register, a STRIDE register, and a plurality skip generators, each having SKIP, SPAN and COUNT registers. An address value is initialized to a first address and each COUNT register is initialized. For each address of the sequence an address value is output and a stride value is added to the address value. For each dimension of the data structure the COUNT register associated with the dimension is updated as each address is generated. For all dimensions, when the COUNT register value becomes zero, the skip value associated with the dimension is added to the address value and its COUNT register is reset to a specified value.

24 Claims, 9 Drawing Sheets

US 7,502,909 B2

MEMORY ADDRESS GENERATION WITH NON-HARMONIC INDEXING

FIELD

This invention relates generally to the field of computer memory. More particularly, this invention relates to memory address generation in an interface between a memory and data processing system.

BACKGROUND

Multi-dimensional data structures, such as digital images and digital video, are commonly stored in 2-dimensional memories. When these data structures are processed, the data values are often accessed non-sequentially. For example, when a spatial filter is applied to sub-array or tile of an image, data values (pixels) must be retrieved in the correct order from the memory. Often, the data values are fed into a data pipeline for efficient processing and the filtering in performed 'in-place' for efficient memory use.

A common problem in the filtering of 2-dimensional images is how to handle border conditions on output, especially when the processing is done in-place on tiles within a larger image array. For example, when a 3×3 filter is applied to a 16×16 tile, 18 input pixels per row need to be processed to produce the 16 output pixels. An efficient pipelined implementation results in 1 output pixel for every input pixel in a row. This results in 18 output pixels, of which the first two are invalid since they were created from input values in the partially filled pipeline that had not been initialized.

One approach to solving this problem is to pre-load the first two input pixels of each row before processing and then only produce 16 output pixels. This requires extra steps for each output row that do not fit into the normal flow of processing. The extra steps and the time needed to restart the processing add complexity and reduce performance.

Another approach is to process all 18 output pixels but reserve a border of extra pixels around the output buffer to hold the invalid output. This border is ignored for all sequential uses of the results. This gives good performance, but corrupts the surrounding pixels, making it unsuitable for processing images in-place.

A further problem when sequentially accessing a multi-dimensional array is that each dimension has a harmonic relation to the next smaller dimension, i.e. it is an integer multiple. This means that only the rollover of an index of one dimension increments the index of the next larger dimension. This creates a chain of dependencies between the indices that affects the inputs to the adder network used to generate the next element address. This, in turn, may result in a long propagation delay in calculating the next address for the worst cases of rollover.

One approach to minimizing this problem is to limit the number of dimensions dependent upon the clock rate. This approach is simple, but does not maximize performance.

Another approach is to add additional logic to create stall cycles when the rollover will propagate over more than one index. This adds some complexity and reduces performance.

Yet another approach is add extra adders and logic to pre-calculate all possible rollovers and their effects on the final address, and then select the appropriate one based on the amount of rollover. This adds complexity.

BRIEF DESCRIPTION OF THE DRAWINGS

The novel features believed characteristic of the invention are set forth in the appended claims. The invention itself, however, and further objects and advantages thereof, will best be understood by reference to the following detailed description of an illustrative embodiment when read in conjunction with the accompanying drawing(s), wherein:

DETAILED DESCRIPTION

Figure 1:
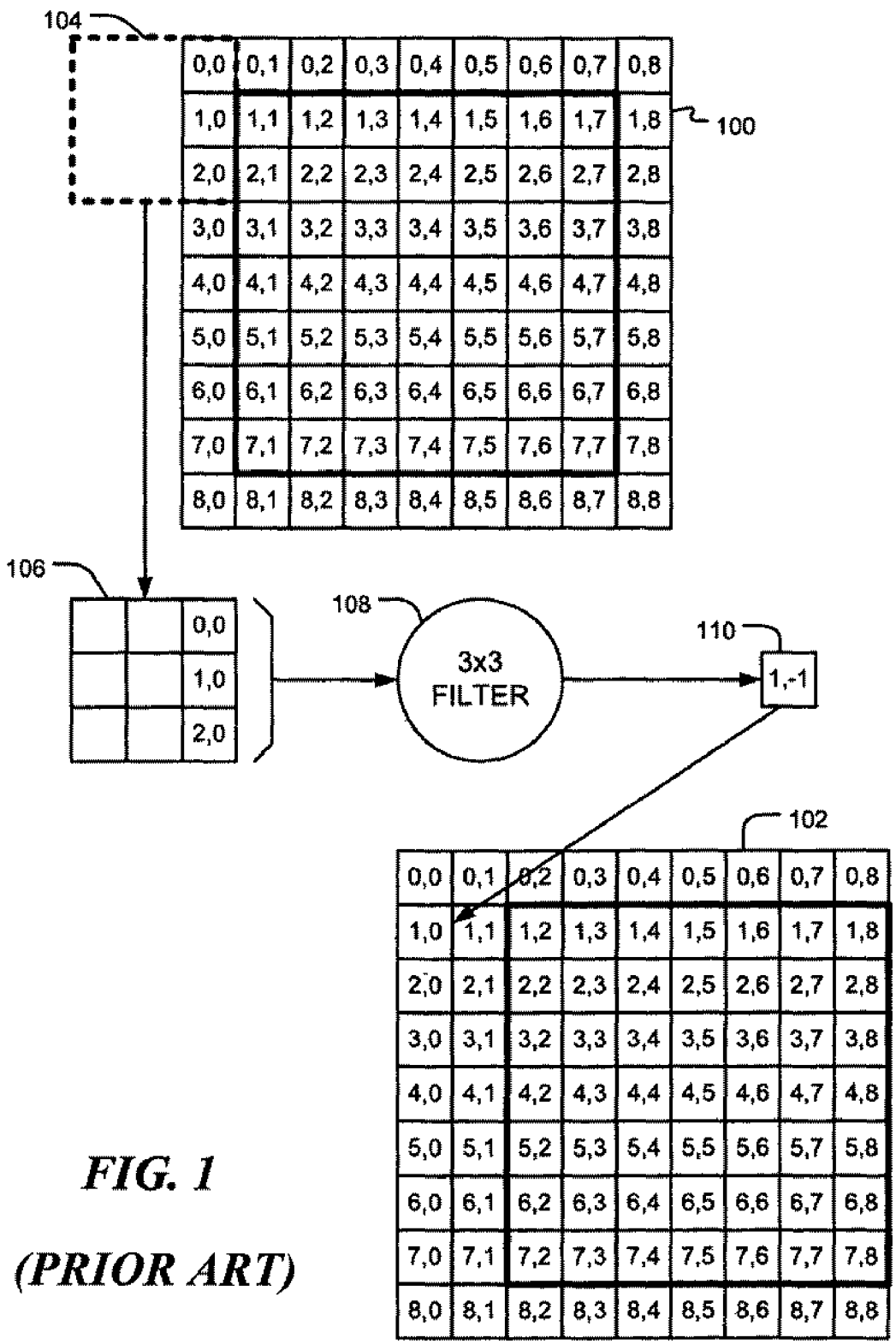
FIG. 1 is a diagrammatic representation of a first step of an exemplary filter operation of the prior art.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates generally to generation of memory addresses within a multi-dimensional array where the array indices used to generate the addresses do not necessarily represent integer multiples of the next smaller array dimensions. Objects and features of the invention will become apparent to those of ordinary skill in the art upon consideration of the following detailed description of the invention.

In one embodiment an address generator has an ADDRESS register which points to the next array element and a STRIDE register that is added to the ADDRESS register on each step. It also has a SPAN, SKIP and COUNT register for each dimension of the array. Each COUNT register is decremented or incremented on each step and, for all dimensions, when the COUNT register indicates that a specified number of addresses have been generated the corresponding SKIP register is added to the ADDRESS register and the COUNT register is reset.

By way of explanation, an exemplary two-dimensional filtering operation is now described. It should be recognized that the invention is not limited to two-dimensional data structures, but may be used with higher dimensional data structures.

FIG. 1 is a diagrammatic representation of the computation of an exemplary pipelined filter operation of the prior art. In this example, elements of the 9×9 tile 100 of a digital image are to be filtered by a 3×3 filter 108 to obtain a 7×7 array of output elements. FIG. 1 depicts the first step in the calculation of elements in row 1 of an output array 102. Box 104 shows the 3×3 sub-array of elements that are used in the computation of the first output element with coordinates (1,0) in the output array. For example, for a linear filter the output is $$y(n, m) = \sum_{j=-1}^{1} \sum_{k=-1}^{1} F(j, k)x(n - j, m - k), \quad (1)$$

where F(j,k) are filter coefficients, x(n,m) denotes the pixel value from row n column m of the input array and y(n,m) is the pixel value for row n column m of the output array.

Array 106 depicts the data pipeline for the computation. Since this is the first step in the computation of row 1, the data pipeline is only partially filled and contains the elements (0,0), (1,0) and (2,0) of the input array. After computation of the filter 108, the result 110 for output y(1,−1) is stored into location (1,0) of the output array. This result is invalid, since the data pipeline was only partially filled.

Figure 2:
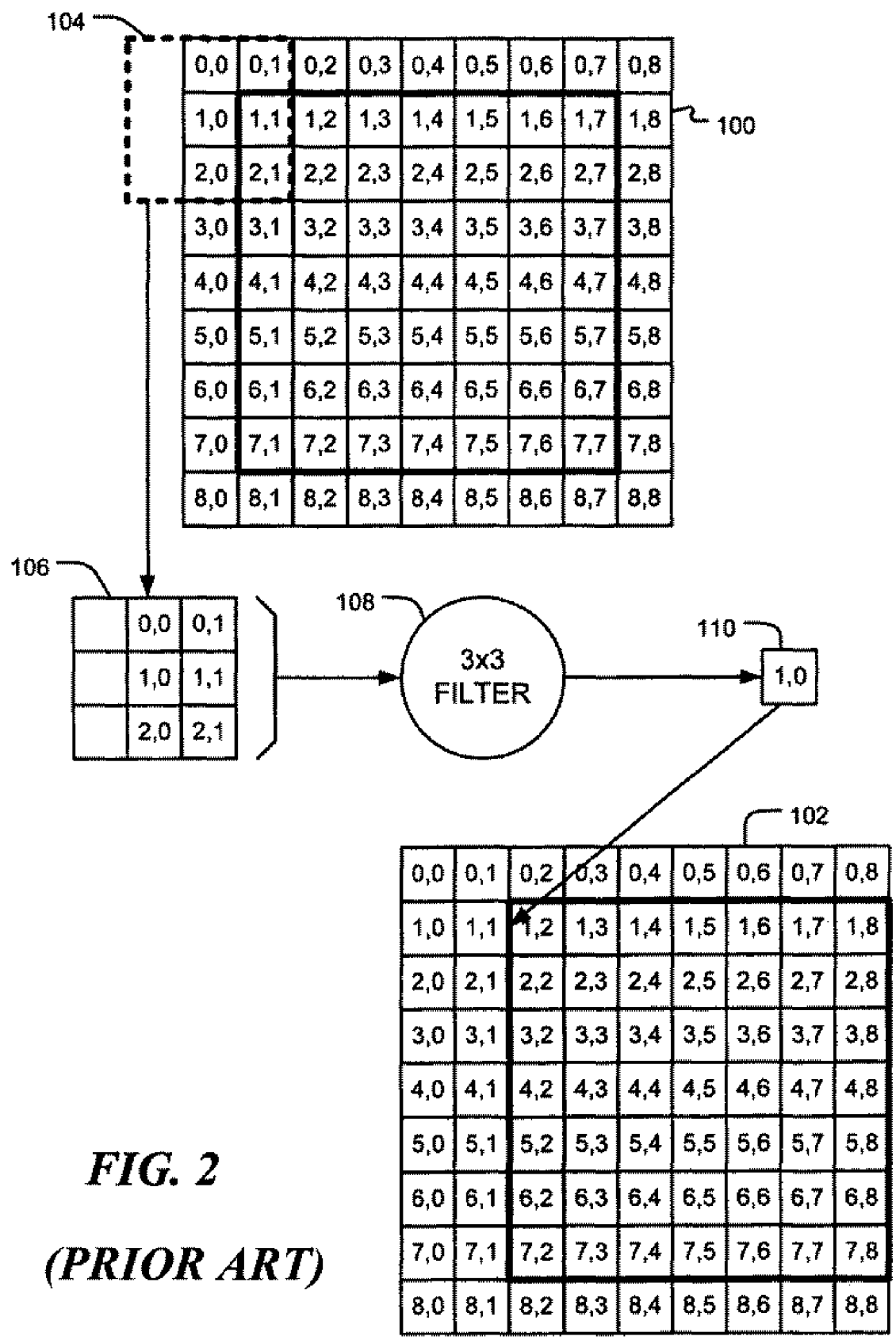
FIG. 2 is a diagrammatic representation of a second step of an exemplary filter operation of the prior art.

The second step of the computation is shown in FIG. 2. Again, the data pipeline 106 is only partially filled, so the result 110 for output element y(1,0) that is stored at location (1,1) in the output array 102 is invalid.

Figure 3:
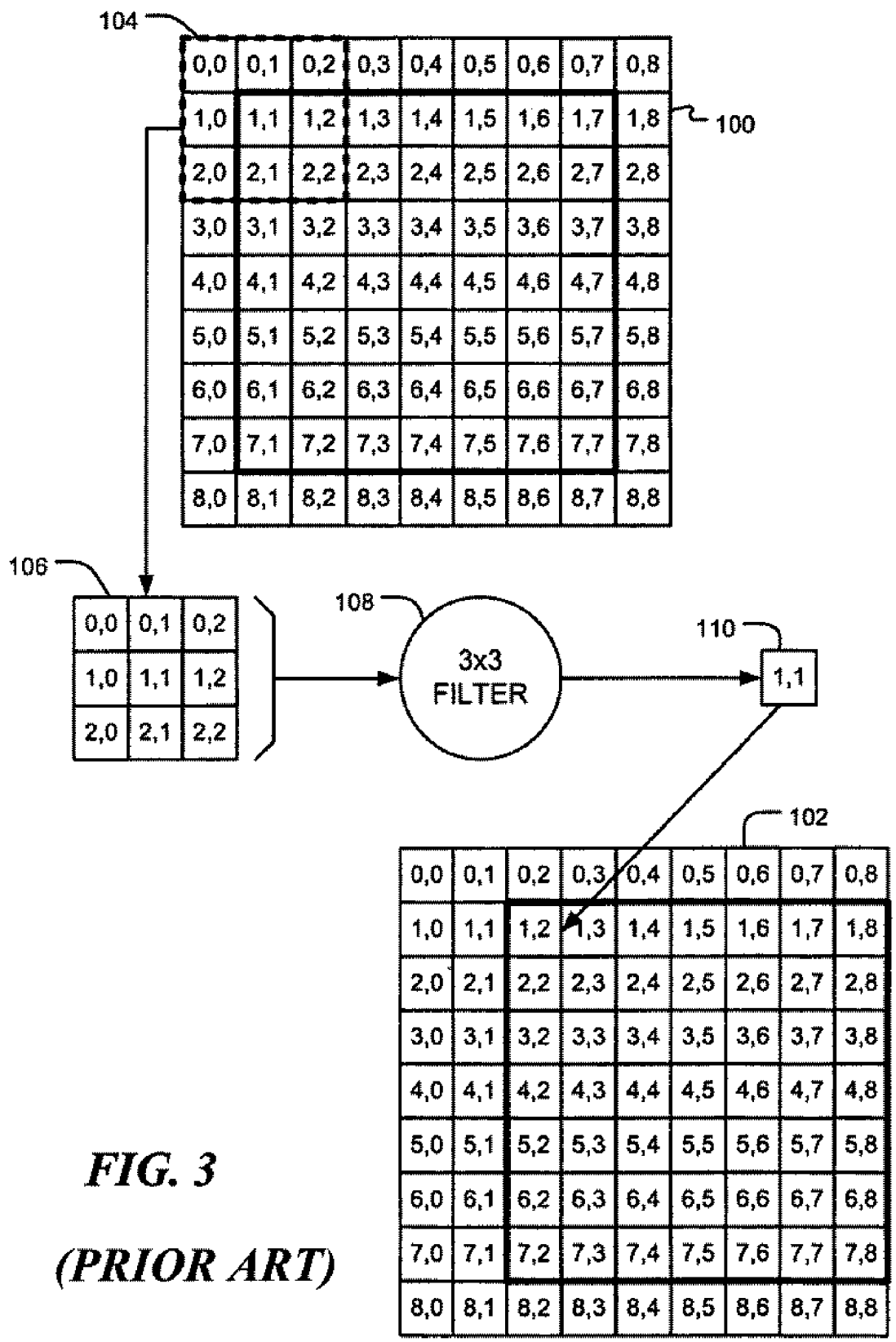
FIG. 3 is a diagrammatic representation of a third step of an exemplary filter operation of the prior art.

The third step of the computation is shown in FIG. 3. This time the data pipeline 106 is completely filled, so the result 110 for output element (1,1), stored at location (1,2) in the output array 102, is valid. All subsequent calculations for row 1 of the output will also be valid. Thus, the result of filtering columns 1-7 and rows 1-7 of the input array is stored in rows 1-7 and columns 2-8 of the output array, as denoted by the boxes with heavy lines in arrays 100 and 102 shown in FIGS. 1-3.

In this example, the elements in columns 0 and 1 of the output array are invalid. If these results are written to the output array, the resulting elements must be considered to be border elements, and should not be used for further processing. Further, a 7×9 array is needed to store the output, even though only 7×7 valid outputs are generated.

The present invention avoids the need for border elements by using non-harmonic array indexing for the output array. When applied to the example described above, one embodiment of the present invention writes the first two invalid output values to the valid region of the output array and then overwrites the values with the valid results. This avoids the need for boundary elements in the output array, since all of the elements of the output are valid at the end of the filtering process, but requires the use of non-harmonic indexing.

In one embodiment of the invention, the addresses in the output array are computed by an address generator that has an ADDRESS register which points to the next array element and a STRIDE register that is added to the ADDRESS register on each step. (It is to be understood that operations on registers are actually operations on the values stored in those registers, so the value stored in the STRIDE register is added to the value stored in the ADDRESS register and the result is stored in the ADDRESS register.) The address generator also has a SPAN, SKIP and COUNT register for each dimension of the array. In this embodiment, each COUNT register counts the number of addresses left before a SKIP value is to be added to the ADDRESS register. Thus, the COUNT register is decremented on each step and, for all dimensions, when the COUNT register becomes zero the corresponding SKIP register is added to the ADDRESS register and the COUNT is reloaded with value in the corresponding SPAN register.

The indices used to generate addresses are not necessarily related to each other, and may not even be related to the dimensions of the array being accessed. This allows a greater variety of access patterns to be generated than is possible with traditional indexing schemes.

An exemplary pseudo-code listing of the address generation is

```
ADDRESS = ADDR0;
for each new element
    for index = 1:N
        COUNT(index) = COUNT(index)−1;
        if COUNT(index) == 0
            COUNT(index) = SPAN(index);
            ADDRESS = ADDRESS + SKIP(index);
        end
    end
    ADDRESS = ADDRESS + STRIDE;
end
``` where ADDR0 is a starting address and N is the number of dimensions. Note that a counter COUNT is decremented and then compared to zero. Alternatively, the counter could be compared to unity before it is decremented.

As an example, the processing a 9×9 tile within a 642×482 image is considered. In a 642×482 image, the element (n,m) is stored at address n×642+m in the array, so element (1,0) is at address 642, element (2,1) is at address 1285 etc. The following values may be used to generate addresses in the input array:
   ADDR0=0,
   STRIDE=642,
   SPAN(1)=3, SKIP(1)=−3*642+1, COUNT(1)=3
   SPAN(2)=3*9, SKIP(2)=642−9, COUNT(2)=3*9
This gives the sequence of addresses: {0, 642, 1284, 1, 643, 1285, 2, 644, 1286, 3, . . . }. In FIG. 1, elements {0, 642, 1284} are placed in the pipeline, in FIG. 2, elements {1, 643, 1285} are placed in the pipeline, and so on.

The following values may be used to generate addresses in the corresponding 7×7 tile within a 642×482 output array:
   ADDR0=643,
   STRIDE=1,
   SPAN(1)=9, SKIP(1)=−2, COUNT(1)=2
   SPAN(2)=9, SKIP(2)=642−7, COUNT(2)=9
This gives the sequence of addresses {643, 644, 643. 644, 645, 646, 647, 648, 649, 1285, 1286, 1285, 1286, 1287, 1288, 1289, 1290, 1291, 1927, 1928, . . . }, which corresponds to the locations {(1,1), (1,2), (1,1), (1,2), (1,3), (1,4), etc}. This avoids the use of border elements.

Filtering of a 642×482 input array generates 640×480 output values. The same approach can be used to generate addresses for a 7×7 tile within a 640×480 output array. The following values may be used:
   ADDR0=0,
   STRIDE=1,
   SPAN(1)=9, SKIP(1)=−2, COUNT(1)=2
   SPAN(2)=9, SKIP(2)=640−7, COUNT(2)=9
This generates the sequence {0, 1, 0, 1, 2, 3, 4, 5, 6, 7, 640, 641, 640, 641, 642, 643, 644, 645, 646, 647, 1280, 1281, 1280, 1281, 1282, . . . }, which corresponds to the locations {(0,1), (0,2), (0,1), (0,2), (0,3), (0,4), etc}.

Figure 4:
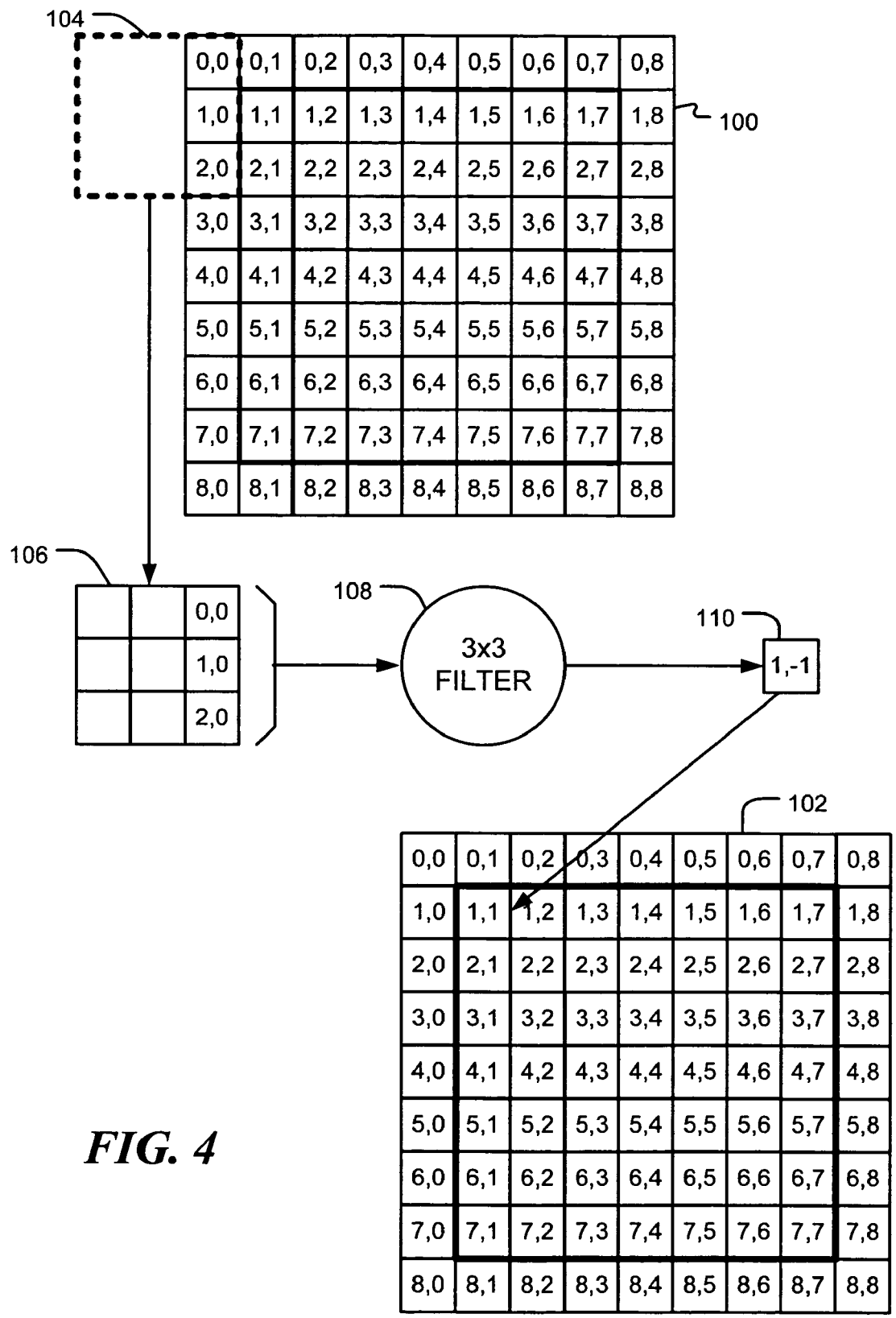
FIG. 4 is a diagrammatic representation of a first step of an exemplary filter operation consistent with certain embodiments of the present invention.

FIG. 4 is a diagrammatic representation of the computation of an exemplary pipelined filter operation in accordance with an embodiment of the present invention. Referring to FIG. 4, elements of sub-array 100 are to be filtered by a 3×3 filter to obtain elements in row 1 of an output array 102. Box 104 shows the 3×3 sub-array of elements that are used in the computation of the first output element y(1,−1).

Array 106 depicts the data pipeline for the computation. Since this is the first step in the computation of row 1, the data pipeline is only partially filled and contains the elements (0,0), (1,0) and (2,0) of the input array. After computation of the filter 108, the result 110 for output y(1,−1) is stored into location (1,1) of the output array. This result is invalid, since the data pipeline was only partially filled. At this first step, the value in register COUNT(1) is 2.

Figure 5:
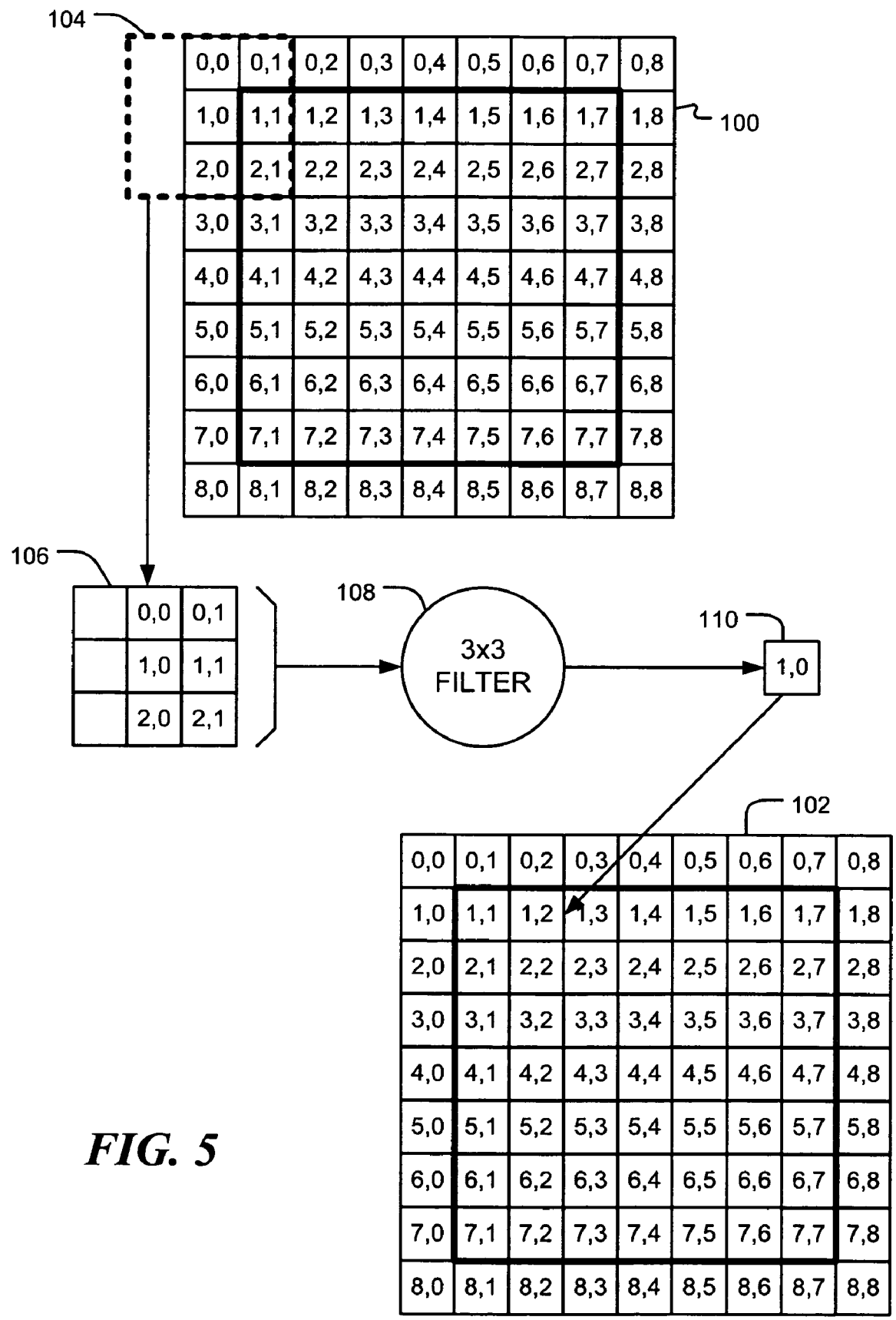
FIG. 5 is a diagrammatic representation of a second step of an exemplary filter operation consistent with certain embodiments of the present invention.

The second step of the computation is shown in FIG. 5. Again, the data pipeline 106 is only partially filled, so the result 110 for output element y(1,0) that is stored at location (1,2) is invalid. At this second step, the value in register COUNT(1) is decremented from 2 to 1.

Figure 6:
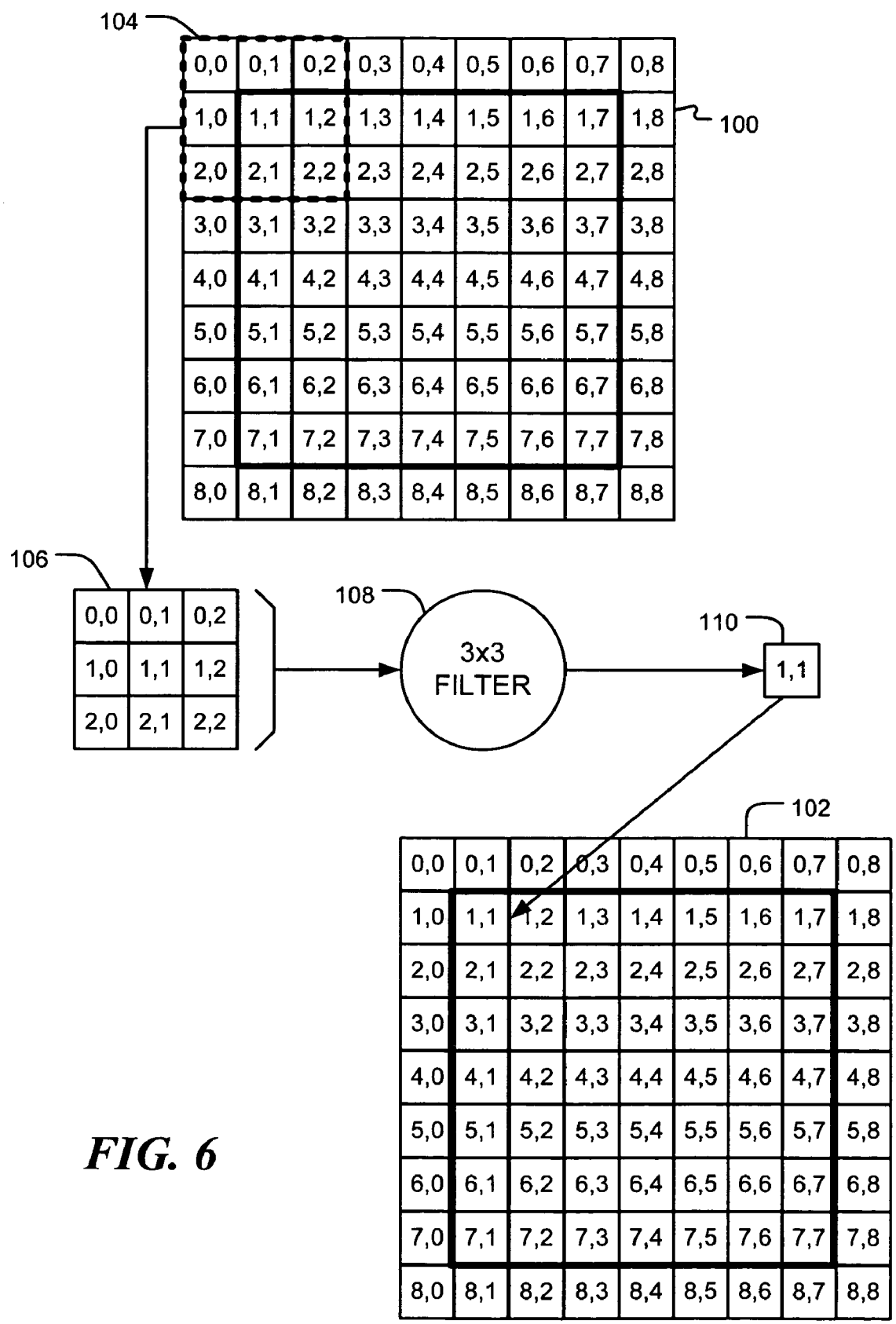
FIG. 6 is a diagrammatic representation of a third step of an exemplary filter operation in consistent with certain embodiments of the present invention.

The third step of the computation is shown in FIG. 6. At this third step, the value in register COUNT(1) is decremented from 1 to 0. Since COUNT(1) has reached zero, it is replaced by SPAN(1), which has the value 9, and the address is modified by SKIP(1), which has the value −2. This moves the address back to location (1,1). The data pipeline 106 is completely filled, so the result 110 for output element (1,1), stored at location (1,1) is valid. This output overwrites the invalid output for y(1,−1) that was previously stored at location (1,1). All subsequent calculations for row 1 of the output will also be valid. In particular, the output for y(1,2) will overwrite the invalid output for y(1,0). Thus, the result of filtering columns 1-7 and rows 1-7 of the input array is stored in rows 1-7 and columns 1-7 of the output array, as denoted by the boxes with heavy lines in FIG. 6. Thus, the need for border elements is eliminated.

In one embodiment, for an K×K filter acting on an L×L tile in an N×M array, the following values:
STRIDE=N,
SPAN(1)=K, SKIP(1)=−K*N+1, COUNT(1)=3
SPAN(2)=K*L, SKIP(2)=N−L, COUNT(2)=K*L are used to generate addresses in the input array, while the values
ADDR0=N+1,
STRIDE=1,
SPAN(1)=L, SKIP(1)=1−K, COUNT(1)=K−1
SPAN(2)=L, SKIP(2)=N−L+2, COUNT(2)=L are used to generate addresses in the output array.

In accordance with one aspect of the invention, a method is provided to generate memory addresses for use in processing a sub-array of data structure. The method comprises generating one or more addresses of elements in the sub-array, retrieving elements in the sub-array stored at the one or more addresses in a memory into a data pipeline, processing the elements in the data pipeline to produce an output element, generating an output address in the memory and storing the output element at the output address in the memory. The output element is valid if the data pipeline is full and invalid otherwise. An output address in the memory is generated by generating an address in the sub-array that is to be overwritten by a valid output element if the output is invalid and generating an address in the sub-array that is not to be overwritten if the output is valid.

Figure 7:
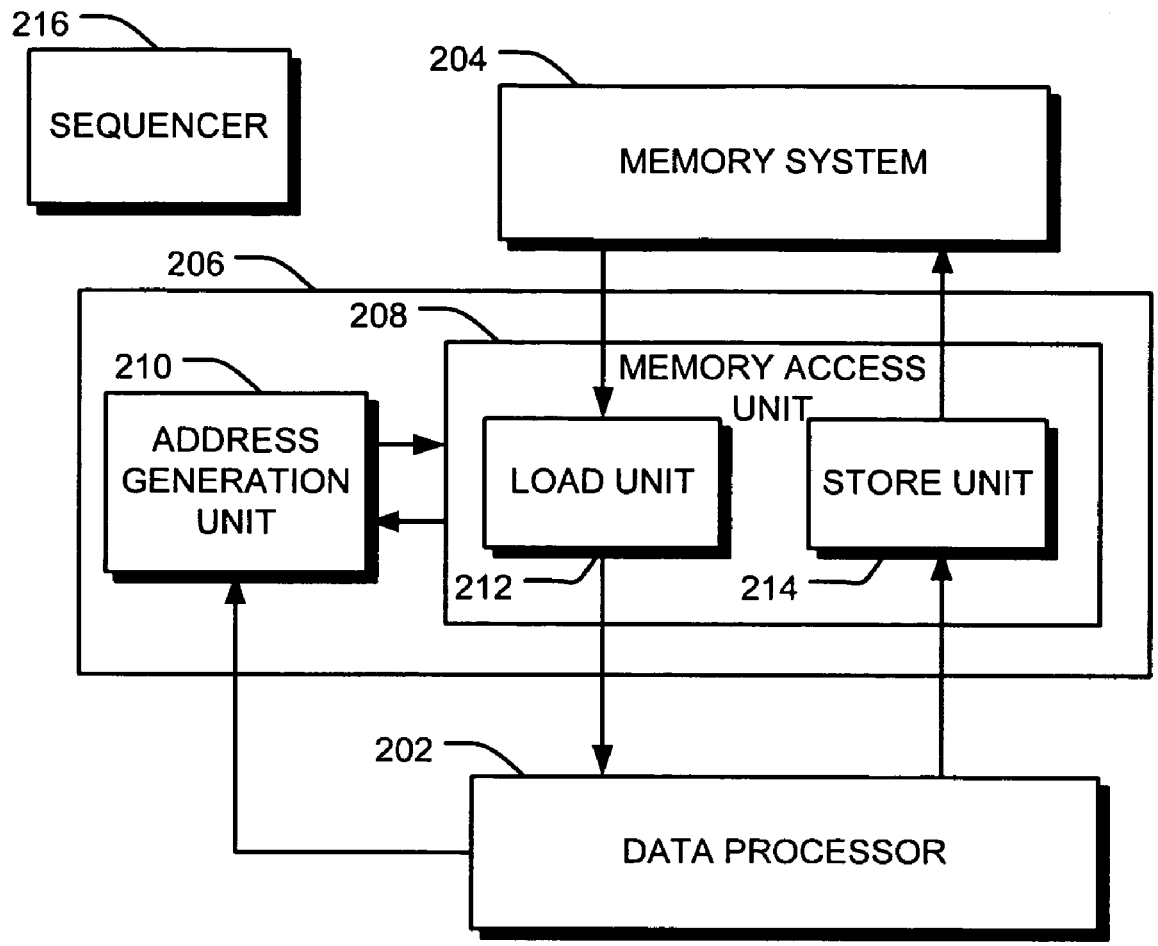
FIG. 7 is a block diagram of a data processing system consistent with certain embodiments of the present invention.

FIG. 7 is a block diagram of a data processing system consistent with certain embodiments of the present invention. Referring to FIG. 7, the data processing system 200 includes a data processor 202, a memory system 204 and a memory interface 206. The memory interface 206 includes memory access unit 208 and an address generation unit 210. The memory access unit 208 includes a load unit 212 and a store unit 214. Operation of the data processing system is controlled by a sequencer 216. In operation, the address generation unit 210 calculates the locations in the memory system 204 of data values to be retrieved from the memory system 204 by the load unit 210, or stored to the memory system 204 by the stored unit 212. More than one address generation unit may be used. For example, two address generation units may be used so that the load unit and the store unit each have a dedicated address generation unit. For more complex filtering operations, such as motion detection between video frames, two or more data structures may be accessed simultaneously. This can be achieved using additional address generation units and additional load units. Additional address generation units may also be used when multiple processors are present.

Figure 8:
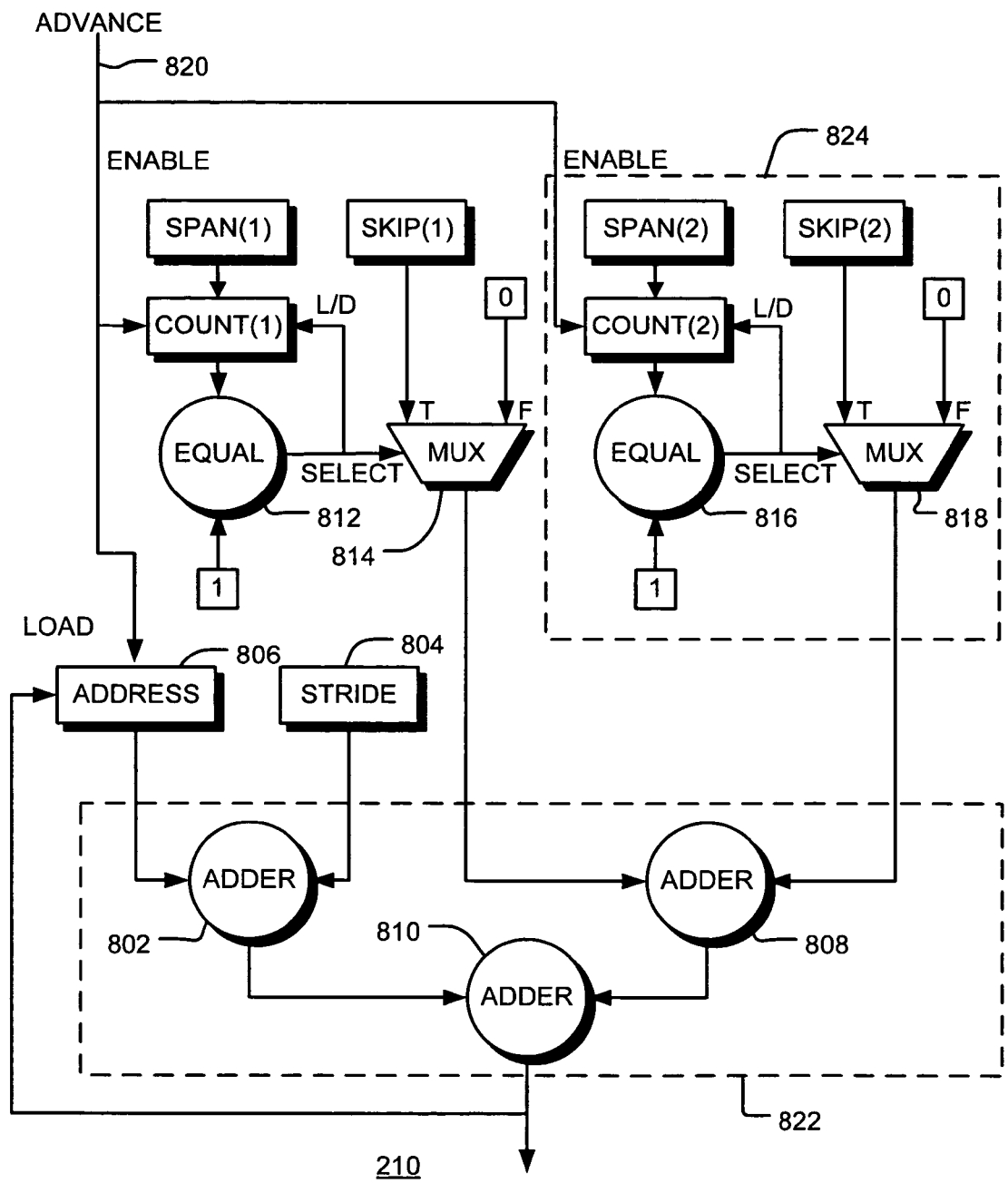
FIG. 8 is a block diagram of an address generation unit consistent with certain embodiments of the present invention.

FIG. 8 is a block diagram of an address generation unit consistent with certain embodiments of the present invention. Referring to FIG. 8, the address generation unit 210 includes a first adder 802 that adds a value from a stride register 804 to an address in address register 806. At the start of each address generation sequence, the address register 806 is loaded with a starting address. The output of adder 802 is added to the output of adder 808 in adder 810 to get the next address in the sequence of addresses. At the start of each address generation sequence, the counters COUNT(1) and COUNT(2) are initialized. In each processing cycle the value of COUNT(1) is checked in EQUAL unit 812. If the value is equal to one, the output of the EQUAL unit 812 (labeled SELECT in the figure) is set to true. This causes the multiplexer 814 to select the value in register SKIP(1) rather than the value zero. It also signals the counter COUNT(1) (via the Load/Decrement control line designated as 'L/D' in the figure) to be reloaded with the value in register SPAN(1). If COUNT(1) is not equal to 1, the counter is decremented. Similarly, the value of COUNT(2) is checked in EQUAL unit 816. If the value is equal to one, the output of the EQUAL unit 816 (labeled SELECT in the figure) is set to true. This causes the multiplexer 818 to select the value in register SKIP(2) rather than the value zero. It also signals the counter COUNT (2) (via the Load/Decrement control line designated as 'L/D' in the figure) to be reloaded with the value in register SPAN(2). If COUNT(2) is not equal to one, the counter is decremented. The outputs from multiplexers 814 and 818 are added in adder 808. The result from adder 810 is output as the next address in the sequence of addresses and is also loaded into the ADDRESS register 806. Synchronization of the unit is provided by advance line 820.

The adders, 802, 808, and 810, form a network of adders 822 that is operable to add the outputs of the multiplexers for each dimension of the data, the ADDRESS register and the STRIDE register. The additional may be performed in any order.

The address generation unit in FIG. 8 generates address in a two-dimensional data structure. It will be apparent to those of ordinary skill in the art how to amend the address generation unit to generate addresses in a data structure having three or more dimensions. For example, elements in block 824 form a skip generator for dimension 2 of the data structure. The skip generator includes a modulo SPAN(2) counter, a register for storing the SKIP(2) value and a multiplexer operable to select the SKIP(2) value as the output value of the skip generator if the module SPAN(2) counter has expired, and operable to select zero as the output value of the skip generator if the module SPAN(2) counter has not expired. The block 824 may be repeated for additional dimensions (and the adder network 822 expanded accordingly). It is noted that the skip generators are arranged in parallel and the COUNT registers are synchronized by the advance line 820 and are updated at the same rate. This is in contrast to harmonic address generators, where counters are arranged in series.

Figure 9:
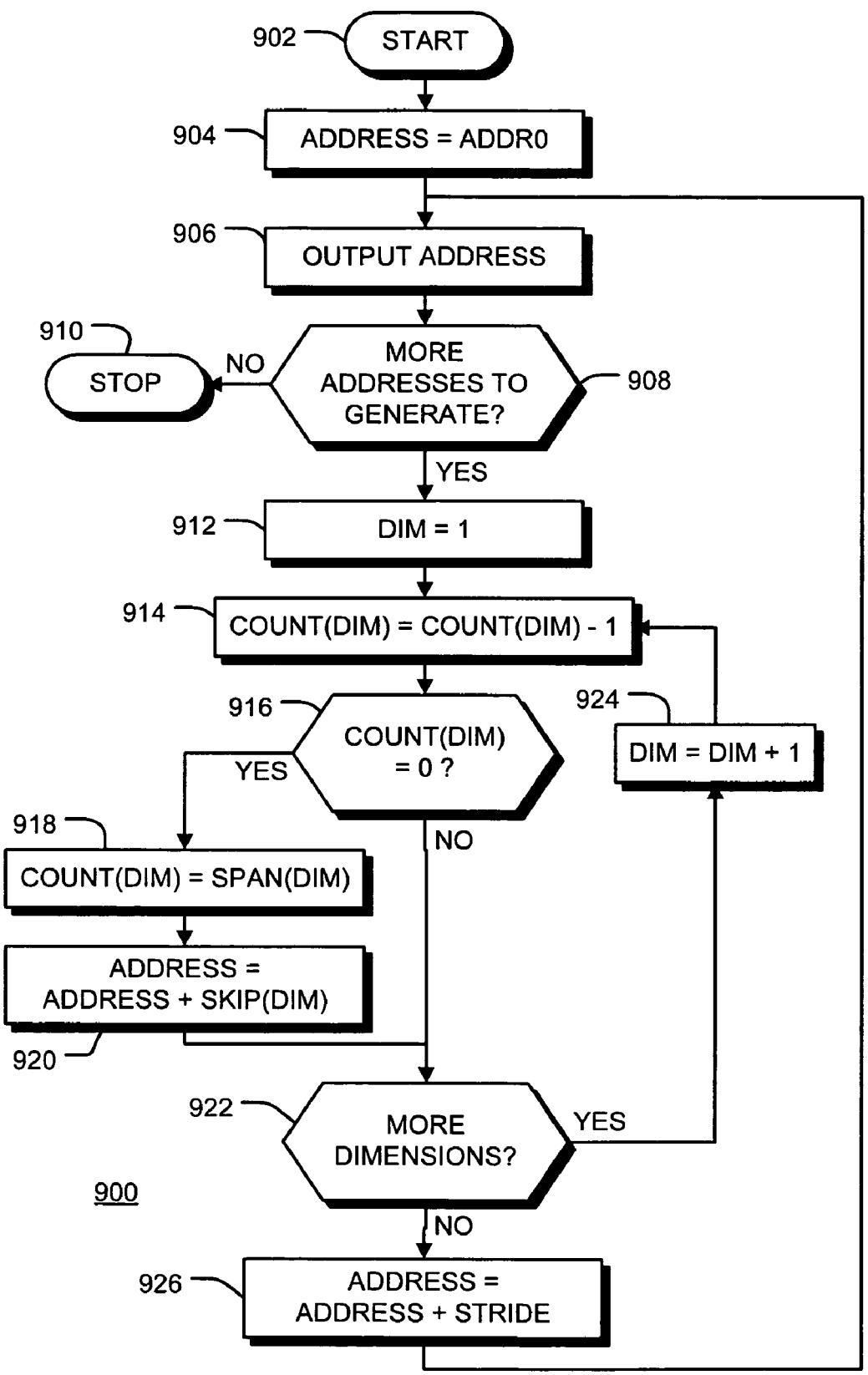
FIG. 9 is a flow chart of a method consistent with certain embodiments of the invention.

FIG. 9 is a flow chart 900 of a method consistent with various embodiments of the invention. Following start block

902, the ADDRESS register is loaded with the starting address (ADDR0) of the sub-array to be retrieved from memory at block 904. At block 906 the ADDRESS is output (to a memory access unit for example). At decision block 908, a check is made to determine if more addresses are to be generated. This step may be implemented by a counter, for example. If no more addresses are required, as depicted by the negative branch from decision block 908, the process terminates at block 910. If more addresses are to be generated, as depicted by the positive branch from decision block 908, flow continues to block 912 where a dimension counter DIM is initialized. At block 914, the COUNT register for the current dimension (DIM) is decremented. At decision block 916, a check is made to determine if the COUNT register for the current dimension is zero. If COUNT(DIM) is equal to zero, as depicted by the positive branch from decision block 916, the COUNT register is set to value stored in the SPAN register for this dimension at block 918 and the ADDRESS register is incremented by the value in the SKIP register for this dimension at block 920. Flow then continues to decision block 922. Flow also continues to decision block 922 if the COUNT register for this dimension is not equal to zero (as depicted by the negative branch from decision block 916). At decision block 922 a check is made to determine if all dimensions have been processed. If there are more dimensions to process, as depicted by the positive branch from decision block 922, the dimension counter DIM is incremented at block 924 and flow returns to block 914. If there are no more dimensions to process, as depicted by the negative branch from decision block 922, the ADDRESS register is incremented by the value in the STRIDE register to generate the next address in memory and flow returns to block 906, where the new ADDRESS is outputted.

It is evident that many alternatives, modifications, permutations and variations will become apparent to those of ordinary skill in the art in light of the foregoing description. For example, in the embodiment described above, the COUNT registers are counters that are decremented to indicate the number of addresses to be generated before a SKIP adjustment is required. In alternative embodiment, the counters may be incremented to count the number of addresses generated since the last SKIP. In general, the counters may be updated by incrementing or by decrementing.

For example, a pseudo-code listing of a further embodiment of the address generation process is:

```
ADDRESS = ADDR0;
for each new element
    for index = 1:N
        COUNT(index) = COUNT(index) + 1;
        if COUNT(index) == SPAN(index)
            COUNT(index) = 0;
            ADDRESS = ADDRESS + SKIP(index);
        end
    end
    ADDRESS = ADDRESS + STRIDE;
end
``` where ADDR0 is a starting address and N is the number of dimensions. For this embodiment, the following values may be used to generate addresses in the corresponding 7×7 tile within a 642×482 output array:

ADDR0=643,
STRIDE=1,
SPAN(1)=9, SKIP(1)=−2, COUNT(1)=7
SPAN(2)=9, SKIP(2)=642−7, COUNT(2)=0

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An address generation unit for generating a sequence of addresses of a data structure in a memory, the data structure having a plurality of dimensions, the address generation unit comprising:
   an ADDRESS register for storing the address of the next element in the data structure;
   a STRIDE register;
   a plurality of skip generators, one for each dimension of the data structure, each skip generator operable to produce a SKIP value and each comprising:
       a SKIP register;
       a SPAN register; and
       a COUNT register; and
   a network of adders coupled to the ADDRESS register, the STRIDE register and the plurality of skip generators and operable to output the sequence of addresses,
   wherein a first skip generator is configured to move the address from a first dimension of the plurality of dimensions to a second dimension of the plurality of dimensions and a second skip generator is configured to move the address within a dimension of the plurality of dimensions.

2. An address generation unit in accordance with claim 1, wherein a value in a COUNT register is decremented at a step in the sequence and is indicative of the number of address generations left before a corresponding SKIP register value is added to the ADDRESS register value.

3. An address generation unit in accordance with claim 2, wherein at a step in the sequence, the STRIDE register value is added to the ADDRESS register value, each COUNT register value is decremented and, for all skip generators, if the COUNT register value becomes zero the corresponding SKIP register value is added to the ADDRESS register value and the COUNT register is reloaded with the corresponding SPAN register value.

4. An address generation unit in accordance with claim 1, wherein a value in a COUNT register is incremented at a step in the sequence and is indicative of the number of addresses generated since a corresponding SKIP register value was added to the ADDRESS register value.

5. An address generation unit in accordance with claim 4, wherein at a step in the sequence, the STRIDE register value is added to the ADDRESS register value, each COUNT register value is incremented and, for all skip generators, if the COUNT register value becomes equal to the corresponding SPAN register, the corresponding SKIP register value is added to the ADDRESS register value and the COUNT register value is set to zero.

6. An address generation unit in accordance with claim 1, wherein a skip generator of the plurality of skip generators further comprises:
   an equal unit operable to compare a COUNT register value to a specified value; and a multiplexer controlled by the equal unit, the multiplexer operable to select, as output, either the value in a SKIP register or zero.

7. An address generation unit in accordance with claim 6, wherein a COUNT register of a skip generator is a counter and is incremented in each cycle of the sequence unless the COUNT register value is equal to the SPAN register value of the dimension, in which case the COUNT register is reset.

8. An address generation unit in accordance with claim 6, wherein a COUNT register of a skip generator is a counter that is operable to be decremented in each cycle of the sequence unless the counter has expired, in which case the COUNT register is loaded with the SPAN register value of the skip generator.

9. A data processing system comprising:
   a first address generation unit comprising:
      an ADDRESS register for storing an address value;
      a STRIDE register for storing a stride value;
      a plurality of skip generators, each skip generator being operable to generate an output value; and
      an adder network operable to add the address value, the stride value and the output values of the plurality of skip generators to generate a memory address of a sequence of memory addresses;
   a memory system for storing a data structure having a plurality of dimensions;
   a data processor; and
   a memory access unit operable to couple the data processor to the memory system;
   wherein the memory access unit is accessed by the sequence of memory addresses, and wherein a first skip generator of the plurality of skip generators moves the memory address between dimensions of the data structure and a second skip generator of the plurality of skip generators moves the memory address within a dimension of the data structure.

10. A data processing system in accordance with claim 9, wherein the memory access unit comprises a load unit that is operable receive the sequence of memory addresses.

11. A data processing system in accordance with claim 9, wherein the memory access unit comprises a store unit that is operable to receive the sequence of memory addresses.

12. A data processing system in accordance with claim 9, further comprising:
   a second address generation unit;
   wherein the memory access unit comprises a load unit and a store unit and wherein the first address generation unit is operable to pass a sequence of memory addresses to the load unit and second address generation unit is operable to pass a sequence of memory addresses to the store unit.

13. A method for generating a sequence of memory addresses for a multi-dimensional data structure, comprising:
   initializing an address value to a first address;
   for each dimension of the multi-dimensional data structure:
      initializing a counter associated with the dimension; and
   for each address of the sequence of memory addresses:
      a) outputting the address value;
      b) for each dimension of the multi-dimensional data structure:
         (i) updating the counter associated with the dimension;
         (ii) adding a skip value associated with the dimension to the address value if the counter has expired; and
         (iii) resetting the counter to a specified value associated with the dimension if the counter has expired; and
      c) adding a stride value to the address value, wherein a skip value associated with one of the dimensions is negative and moves the address value within a dimension of the dimensional data structure.

14. A method for processing a sub-array of data structure, comprising:
   generating one or more addresses of elements in the sub-array;
      retrieving elements in the sub-array stored at the one or more addresses in a memory into a data pipeline;
      processing the elements in the data pipeline to produce an output element;
      generating an output address in the memory; and
      storing the output element at the output address in the memory;
   wherein the output element is valid if the data pipeline is full and invalid otherwise and wherein generating an output address in the memory comprises:
      if the output is invalid, generating an address in the sub-array that is to be overwritten by a valid output element; and
      if the output is valid, generating an address in the sub-array that is not to be overwritten,
   wherein generating the output address in the memory comprises adding a negative skip value to a prior output address to obtain an output address in the same sub-array dimension as the prior output address if the data pipeline becomes full.

15. A method in accordance with claim 14, wherein the data structure has at least two dimensions.

16. A method in accordance with claim 14, wherein the data structure has two dimensions and wherein processing the elements in the data pipeline to produce an output element comprises filtering the data structure through a two-dimensional filter.

17. A method in accordance with claim 14, wherein the data structure is stored in a first memory and the output address in an address in a second memory.

18. An address generation unit for generating a sequence of memory address of a multi-dimensional data structure, the address generation unit comprising:
   an ADDRESS register for storing an address value;
   a STRIDE register for storing a stride value;
   a plurality of skip generators, one for each dimension of the multi-dimensional data structure, each skip generator being operable to generate an output value; and
   an adder network operable to add the address value, the stride value and the output values of the plurality of skip generators, wherein a first skip generator is configured to move the address from a first dimension of the plurality of dimensions to a second dimension of the plurality of dimensions and a second skip generator is configured to move the address within a dimension of the plurality of dimensions.

19. An address generator in accordance with claim 18, wherein a skip generator of the plurality of skip generators comprises:
   a modulo SPAN counter, where SPAN is a specified value for the dimension;
   a register for storing a SKIP value for the dimension; and
   a multiplexer operable to select the SKIP value as the output value of the skip generator if the module SPAN counter has expired, and operable to select zero as the output value of the skip generator if the module SPAN counter has not expired.

20. An address generator in accordance with claim 19, wherein the modulo SPAN counters for each dimension are updated at the same rate.

21. An address generation means for generating a sequence of memory addresses for a multi-dimensional data structure, comprising:
- a first counting means for counting memory addresses generated;
- a first adding means for adding a first SKIP value to an address value if the first counting means indicates that a first SPAN of memory addresses have been generated, wherein the first SKIP value moves the address value within a dimension of the multi-dimensional data structure;
- a second counting means for counting memory addresses generated;
- a second adding means for adding a second SKIP value to the address value if the second counting means indicates that a second SPAN of memory addresses have been generated, wherein the second SKIP value moves the address value from a first dimension of the multi-dimensional data structure to a second dimension of the multi-dimensional data structure; and
- a third adding means for adding a STRIDE value to the address value.

22. An address generation means in accordance with claim 21, wherein the first counting means is reset if the first counting means indicates that a first SPAN of memory addresses have been generated, and the second counting means is reset if the second counting means indicates that a second SPAN of memory addresses have been generated.

23. An address generation means in accordance with claim 21, further comprising an address value storage means.

24. An address generation means in accordance with claim 23, further comprising a means for initializing the address value storage means, the first counting means and the second counting means to specified values.

* * * * *